United States Patent
Huang

(10) Patent No.: US 10,154,423 B2
(45) Date of Patent: Dec. 11, 2018

(54) END-TO-END NETWORK DIAGNOSTICS

(71) Applicant: Google Inc., Mountain View, CA (US)

(72) Inventor: Jonathan Huang, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 159 days.

(21) Appl. No.: 14/318,520

(22) Filed: Jun. 27, 2014

(65) Prior Publication Data

US 2015/0382215 A1 Dec. 31, 2015

(51) Int. Cl.
*H04W 24/08* (2009.01)
*H04W 84/12* (2009.01)

(52) U.S. Cl.
CPC ............ *H04W 24/08* (2013.01); *H04W 84/12* (2013.01)

(58) Field of Classification Search
CPC ..... H04W 24/08; H04W 84/12; H04W 88/08; H04W 88/12; H04W 24/10; H04W 88/02; H04W 24/04; H04L 43/10; H04L 43/50; H04L 43/0888; H04L 43/0805; H04L 43/0864; H04L 43/0876; H04L 12/2801; H04L 43/06; H04L 43/08; H04L 43/12; H04L 65/4076; H04L 12/2836; H04L 43/04
See application file for complete search history.

(56) References Cited

U.S. PATENT DOCUMENTS

| | | | |
|---|---|---|---|
| 6,993,591 B1 * | 1/2006 | Klemm | H04L 67/2847 707/999.002 |
| 7,337,206 B1 * | 2/2008 | Wen | H04L 12/2602 370/235 |
| 7,411,911 B2 | 8/2008 | Huotari et al. | |
| 7,426,576 B1 * | 9/2008 | Banga | H04L 29/12066 707/999.003 |
| 2004/0047324 A1 * | 3/2004 | Diener | H04L 1/1664 370/338 |

(Continued)

FOREIGN PATENT DOCUMENTS

| EP | 1047228 A2 | 10/2000 |
|---|---|---|
| EP | 1598984 A2 | 11/2005 |

(Continued)

OTHER PUBLICATIONS

Airshark: A System for Automating Wireless Diagnostics and Analysis; http://research.cs.wis.edu/wings/projects/airshark; 3 pgs; 2012.

(Continued)

*Primary Examiner* — Paul H Masur
*Assistant Examiner* — Michael K Phillips
(74) *Attorney, Agent, or Firm* — Colby Nipper

(57) ABSTRACT

A system and machine-implemented method of network diagnostics are provided. First condition information about a wireless local area network is obtained. Second condition information about an access network connecting the wireless local area network to a wide area network is obtained. Third condition information about the wide area network is obtained. Based on the first, second and third condition information, a condition report is provided to a diagnostic module configured to identify one or more network issues across the wireless local area network, the access network and the wide area network based on the condition report.

19 Claims, 5 Drawing Sheets

(56) References Cited

U.S. PATENT DOCUMENTS

| | | | |
|---|---|---|---|
| 2004/0261116 A1* | 12/2004 | Mckeown | H04L 12/2801 725/109 |
| 2005/0013316 A1* | 1/2005 | Liao | H04L 12/5695 370/449 |
| 2005/0114496 A1 | 5/2005 | Fang et al. | |
| 2006/0282704 A1 | 12/2006 | Morgan et al. | |
| 2007/0021116 A1 | 1/2007 | Okita et al. | |
| 2008/0059474 A1* | 3/2008 | Lim | G06F 17/3089 |
| 2008/0117860 A1 | 5/2008 | Rodriguez et al. | |
| 2008/0262901 A1* | 10/2008 | Banga | G06Q 10/06375 705/14.53 |
| 2008/0263633 A1* | 10/2008 | Banga | G06Q 30/02 726/3 |
| 2009/0129263 A1* | 5/2009 | Osborn | H04W 76/022 370/230 |
| 2009/0144792 A1* | 6/2009 | Fielibert | H04N 21/23608 725/116 |
| 2009/0274104 A1* | 11/2009 | Addy | H04M 11/04 370/329 |
| 2010/0077075 A1 | 3/2010 | Cuni et al. | |
| 2010/0097210 A1* | 4/2010 | Tyroler | G01D 21/00 340/540 |
| 2010/0182983 A1 | 7/2010 | Herscovici et al. | |
| 2011/0096678 A1* | 4/2011 | Ketonen | H04L 12/2602 370/252 |
| 2011/0149720 A1* | 6/2011 | Phuah | H04L 12/2697 370/216 |
| 2011/0255506 A1* | 10/2011 | Toth | H04B 7/18506 370/331 |
| 2012/0110640 A1 | 5/2012 | Donelson et al. | |
| 2012/0134280 A1 | 5/2012 | Rotvold et al. | |
| 2012/0236779 A1* | 9/2012 | Lee | H04W 8/186 370/312 |
| 2013/0065633 A1 | 3/2013 | Sridhara et al. | |
| 2013/0094551 A1* | 4/2013 | Ling | G06F 1/3209 375/222 |
| 2013/0223273 A1 | 8/2013 | Chang et al. | |
| 2013/0225181 A1* | 8/2013 | Radulescu | H04W 36/22 455/442 |
| 2013/0326551 A1* | 12/2013 | Chatterjee | H04W 24/10 725/9 |
| 2014/0112320 A1 | 4/2014 | Makhlouf et al. | |
| 2014/0130111 A1* | 5/2014 | Nulty | H04N 17/004 725/107 |
| 2014/0165163 A1 | 6/2014 | Salkintzis | |
| 2014/0196126 A1 | 7/2014 | Peterson et al. | |
| 2014/0321298 A1* | 10/2014 | Chow | H04L 41/083 370/252 |
| 2015/0070187 A1* | 3/2015 | Wiesner | A61B 5/0022 340/870.02 |
| 2015/0189557 A1* | 7/2015 | Touati | H04W 36/0066 370/332 |
| 2016/0080958 A1* | 3/2016 | Rinne | H04W 24/10 370/338 |
| 2017/0180549 A1* | 6/2017 | Zahedi | H04M 3/306 |

FOREIGN PATENT DOCUMENTS

| | | |
|---|---|---|
| EP | 2940930 A1 | 11/2015 |
| WO | 2007/062108 A2 | 5/2007 |
| WO | 2013/128242 A1 | 9/2013 |

OTHER PUBLICATIONS

Shravan Rayanchu, Ashish Patro, Suman Banerjee; Airshark: Detecting Non-WiFi RF Devices using Commodity WiFi Hardware; 14 pgs; University of Wisconsin, Madison, WI; Nov. 4, 2011.

Srikanth Sundaresan, Nick Feamster, Renata Teixeira, Yan Grunenberg, Dina Papagiannaki, Dave Levin; Characterizing Home Network Performance Problems; 12 pgs; Georgia Tech, Atlanta, GA; Sep. 23, 2013.

Partha Kanupathy, Constantine Dovrolis, Konstantina Papagiannaki, Srinivasan Seshan, Peter Steenkiste; Can User-Level Probing Detect and Diagnose Common Home-WLAN Pathologies?; 8 pgs; Georgia Tech, Atlanta, GA; Jan. 2012.

Kyung-Hwa Kim, Hyunwoo Nam, Henning Schulzrinne; WiSlow: A WiFi Network Performance Troubleshooting Tool for End Users; 8 pgs; Columbia University, New York, NY; 2013.

International Preliminary Report on Patentability dated Dec. 27, 2016, which issued in International Application No. PCT/US2015/036482.

European Patent Office; European Search Report; Appl. No. 15810011.5; dated Jan. 22, 2018.

European Patent Office; Extended European Search Report; Appl. No. 15812778.7; dated Feb. 13, 2018.

European Patent Office; Extended European Search Report; Appl. No. 15829832.3; dated Mar. 1, 2018.

European Patent Office; European Search Report; Appl. No. 15814969.0; dated Jan. 30, 2018.

Cordeiro, Carlos de M. et al.; "The Last Mile: Wireless Technologies for Broadband and Home Networks"; Center for Distributed and Mobile Computing, ECECS; May 2003.

* cited by examiner

END-TO-END NETWORK DIAGNOSTICS

BACKGROUND

The present disclosure generally relates to network diagnostics, and in particular, to end-to-end network diagnostics.

Network connectivity problems often create issues for users ranging from malfunction of applications (e.g., web browser and email) to complete loss of connectivity. The network connectivity problems may come from the wireless network. For example, interference between network devices, non-network device interference, wireless routers, and/or weak wireless signals may result in a bad wireless connection. The network connectivity problems may come from outside the wireless network, such as broadband modem issues, internet service provider problems, and online services performance issues.

SUMMARY

The disclosed subject matter relates to a system for network diagnostics. The system comprises one or more processors, and a machine-readable medium comprising instructions stored therein, which when executed by the one or more processors, cause the one or more processors to perform operations comprising obtaining first condition information about a wireless local area network. The operations further comprise obtaining second condition information about an access network connecting the wireless local area network to a wide area network. The operations further comprise obtaining third condition information about the wide area network. In addition, the operations comprise providing a condition report based on the first, second and third condition information to a diagnostic module configured to identify one or more network issues across the wireless local area network, the access network and the wide area network based on the condition report.

The disclosed subject matter also relates to a computer-implemented method of network diagnostics. The method comprises obtaining first condition information about a wireless local area network. The method further comprises obtaining second condition information about an access network connecting the wireless local area network to a wide area network. The method further comprises obtaining third condition information about the wide area network. The method further comprises analyzing the first condition information, the second condition information and the third condition information. In addition, the method comprises identifying one or more network issues across the wireless local area network, the access network and the wide area network based on the analysis.

The disclosed subject matter further relates to a machine-readable medium comprising instructions stored therein, which when executed by a system, cause the system to perform operations comprising receiving a condition report that includes condition information about a wireless local area network, an access network and a wide area network, wherein the access network connects the wireless local area network to the wide area network. The operations further comprise determining one or more network diagnostic criteria. In addition, the operations comprise identifying one or more network issues across the wireless local area network, the access network and the wide area network based on the condition report and the one or more network diagnostic criteria.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several embodiments of the subject technology are set forth in the following figures.

DETAILED DESCRIPTION

Figure 1:
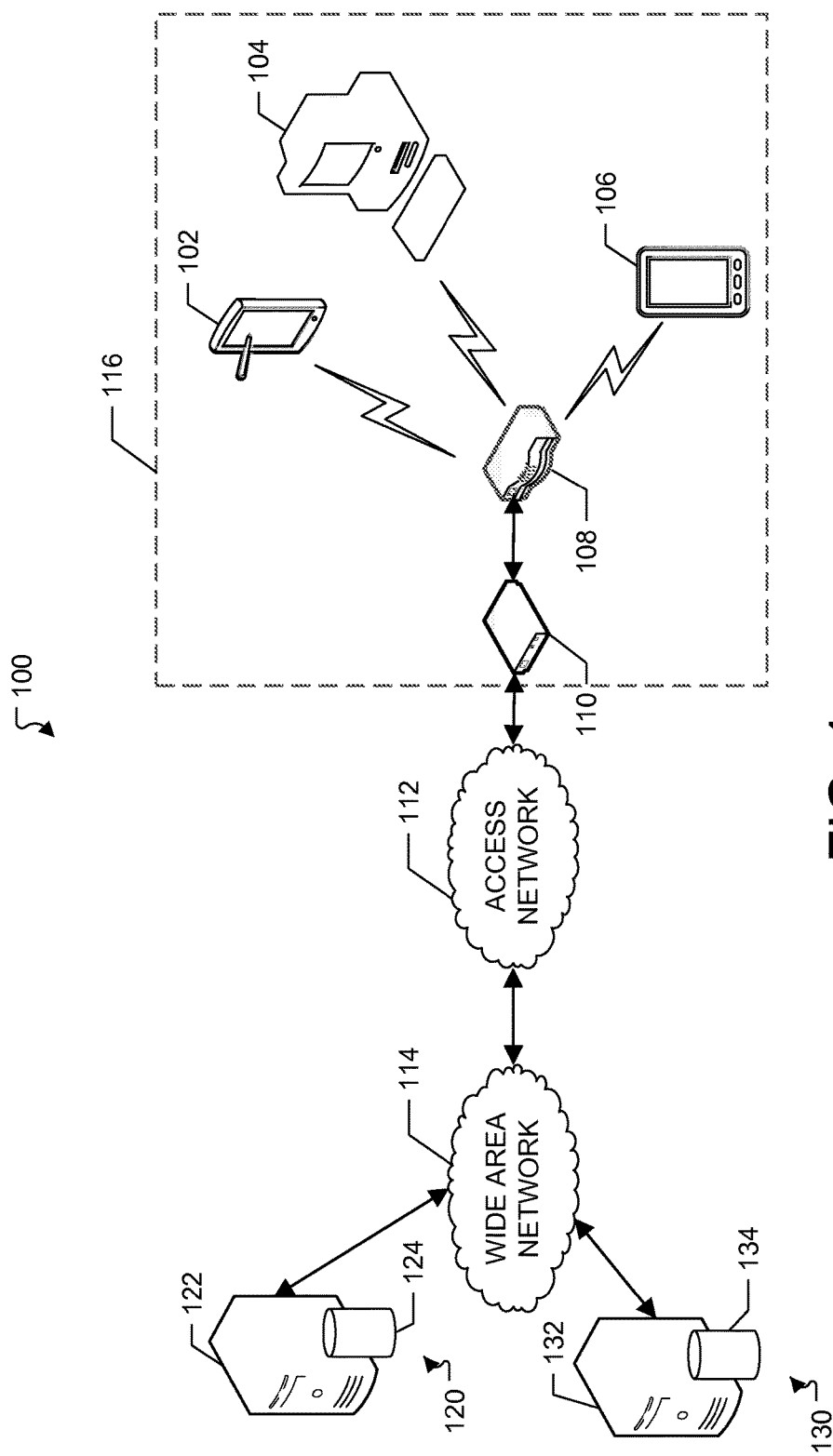
FIG. 1 illustrates an example network environment which provides for end-to-end network diagnostics.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

As noted above, network connectivity problems often create issues for users ranging from malfunction of applications (e.g., web browser and email) to complete loss of connectivity. The network connectivity problems may come from the wireless network. For example, interference between network devices, non-network device interference, wireless routers, and/or weak wireless signals may result in a bad wireless connection. The network connectivity problems may come from outside the wireless network, such as broadband modem issues, internet service provider problems, and online services performance issues.

A user may access the Internet by connecting a wireless client device to a server on the Internet via intermediate devices and networks. In some implementations, a wireless client device may be connected to a wireless local area network, which is configured to communicate with servers on a wide area network (e.g., the Internet) via an access network. The wireless local area network may include wireless client devices connected to the wireless local area network through a wireless access point or wireless router. The wireless local area network may be connected with the access network via a broadband modem. The wide area network may include servers, such as authentication servers, web servers, electronic messaging servers, etc., accessible to the client device. With the intermediate devices and networks, users may find it difficult to locate and diagnose the source of the network connectivity problems encountered at the client device. For example, the user may need to perform several steps to analyze the problem, such as calling the internet service provider, reconfiguring the broadband modem, and/or restarting the wireless client device.

The subject disclosure provides for end-to-end network diagnostics to assist the user in locating the source of network connectivity problems. In some implementations, the wireless access point obtains condition information about the wireless local area network, condition information about the access network connecting the wireless local area network to the wide area network and/or condition information about the wide area network. The wireless access point provides a condition report based on the obtained condition information to a diagnostic module configured to identify network issues across the wireless local area network, the access network and/or the wide area network based on the condition report.

FIG. 1 illustrates an example network environment which provides for end-to-end network diagnostics. Network environment 100 includes computing devices 102, 104 and 106 (hereinafter "102-106") communicably connected to servers 120 and 130 via wireless local area network 116, access network 112 and wide area network 114. Wireless local area network 116 includes wireless access point 108 and computing devices 102-106. Wireless local area network 116 may be connected with the access network 112 via broadband modem 110.

Each of computing devices 102-106 can represent various forms of processing devices. Example processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices. Computing devices 102-106 may be provided access to or receive application software executed or stored on any of other computing devices 102-106.

Servers 120 and 130 can include computing device 122 and 132 and computer-readable storage device 124 and 134 (e.g., data stores). Each of servers 120 and 130 may be a system or device having a processor, a memory, and communications capability for providing content and/or services to the computing devices. In some example aspects, each of servers 120 and 130 can be a single computing device, for example, a computer server. In other embodiments, each of servers 120 and 130 can represent more than one computing device working together to perform the actions of a server computer (e.g., cloud computing). Further, each of servers 120 and 130 can represent various forms of servers including, but not limited to an application server, a proxy server, a network server, an authentication server, an electronic messaging server, a content server, a server farm, etc., accessible to computing devices 102-106. For example, server 120 may be an internet service provider server that provides services for accessing and/or using wide area network 114. Server 130 may be a web server that delivers web content accessible through wide area network 114.

A user may interact with the content and/or services provided by servers 120 and 130, through a client application installed at computing devices 102-106. Alternatively, the user may interact with the system through a web browser application at computing devices 102-106. Communication between computing devices 102-106 and servers 120 and 130 may be facilitated through wireless local area network 116, access network 112 and/or wide area network 114.

In some aspects, computing devices 102-106 may communicate wirelessly through a communication interface (not shown), which may include digital signal processing circuitry where necessary. The communication interface may provide for communications under various modes or protocols, for example, Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, for example, using a Bluetooth, WiFi, or other such transceiver.

Wide area network 114 can include, but is not limited to, a large computer network that covers a broad area (e.g., across metropolitan, regional, national or international boundaries), for example, the Internet, a private network, a cellular network, or a combination thereof connecting any number of mobile clients, fixed clients, and servers. Further, wide area network 114 can include, but is not limited to, any of the following network topologies, including a bus network, a star network, a ring network, a mesh network, a star-bus network, tree or hierarchical network, and the like. In some aspects, communication between clients (e.g., computing devices 102-106) and servers (e.g., servers 120 and 130) can occur via a virtual private network (VPN), Secure Shell (SSH) tunnel, or other secure network connection. Wide area network 114 may include one or more wired or wireless network devices that facilitate device communications between computing devices 102-106 and severs 120 and 130, such as switch devices, router devices, relay devices, etc., and/or may include one or more servers.

Access network 112 can include, but is not limited to, a cable access network, public switched telephone network, and/or fiber optics network to connect wide area network 114 to wireless local area network 116. Access network 112 may provide last mile access to internet. Access network 112 may include one or more routers, switches, splitters, combiners, termination systems, central offices for providing broadband services.

Wireless local area network 116 can include, but is not limited to, a computer network that covers a limited geographic area (e.g., a home, school, computer laboratory, or office building) using a wireless distribution method (e.g., spread-spectrum or OFDM). Wireless client devices (e.g., computing devices 102-106) may associate with a wireless access point (e.g., wireless access point 108) to access wireless local area network 116 using WiFi standards (e.g., IEEE 802.11). Alternatively or in addition, wireless local area network 116 can link wireless client devices (e.g., computing devices 102-106) using the wireless distribution method (e.g., WiFi Direct).

For exemplary purposes, wireless local area network 116 is illustrated as including multiple computing devices 102-106; however, wireless local area network 116 may include only one of computing devices 102-106. In some implementations, wireless local area network 116 may be, or may include, one or more of a bus network, a star network, a ring network, a relay network, a mesh network, a star-bus network, a tree or hierarchical network, and the like.

Wireless access point 108 can include a network-connectable device, such as a hub, a router, a switch, a bridge, or an access point. The network-connectable device may also be a combination of devices, such as a WiFi router that can include a combination of a router, a switch, and a wireless access point. Other network-connectable devices can also be utilized in implementations of the subject technology. Wireless access point 108 can allow wireless client devices (e.g., computing devices 102-106) to connect to wide area network 114 via access network 112. An example wireless access point 108 is discussed further below with respect to FIG. 2.

Broadband modem 110 may be a broadband modem, such as a cable modem, a digital subscriber line (DSL) modem, a satellite modem, or a power line modem. Broadband modem 110 may be an integral component of wireless access point 108 rather than a separate standalone device. For example, wireless access point 108 may include broadband modem 110 as a built in modem.

A user at any of computing devices 102-106, such as computing device 102, may encounter network connectivity problems when trying to access a server (e.g., server 120) connected to wide area network 114, such as when loading a webpage in a web browser on computing device 102. Computing device 102 may access server 120 by connecting to an intermediary device, such as wireless access point 108, between computing device 102 and access network 112 connected with wide area network 114. However, the source of the network connectivity problem within the wireless local area network 116, the access network 112, and/or the wide area network 114 may not be apparent to the user.

As the intermediary device, wireless access point 108 may be suitable and uniquely positioned to diagnose the source of the network connectivity problem. For example, wireless access point 108 may obtain network traffic information of wireless local area network 116, access network 112 and wide area network 114 to identify network issues.

Wireless access point 108 may obtain first condition information about the wireless local area network 116. Obtaining the first condition information may include performing a spectrum analysis of a wireless link connecting computing device 102 and wireless access point 108 in wireless local area network 116. Wireless access point 108 may obtain second condition information about access network 112 connecting wireless local area network 116 to wide area network 114. Obtaining the second condition information about access network 112 may include requesting diagnostic data from an access network device (e.g., broadband modem 110) connecting wireless local area network 116 to access network 112.

Wireless access point 108 may obtain third condition information about wide area network 114. Obtaining the third condition information about wide area network 114 may include sending a request to a server, such as one or more of servers 120 and 130, on wide area network 114 and receiving a response to the request. Wireless access point 108 may use the first, second and third information to facilitate network diagnostics, as is discussed further below with respect to FIGS. 3-4.

Computing device 102 may send a request for a condition report and/or the first, second and/or third condition information to the wireless access point 108 to identify and diagnose network issues encountered by computing device 102.

In response to the request, wireless access point 108 may provide a condition report based on the first, second and third condition information to computing device 102. Wireless access point 108 may provide the condition report at a predetermined time interval, rather than, and/or in addition to, in response to the request. Computing device 102 may receive the condition report and identify the source of network issues across wireless local area network 116, access network 112 and wide area network 114 based on the condition report. Alternatively, or in addition, wireless access point 108 may identify the source of network issues across wireless local area network 116, access network 112 and wide area network 114 based on the condition report.

Figure 2:
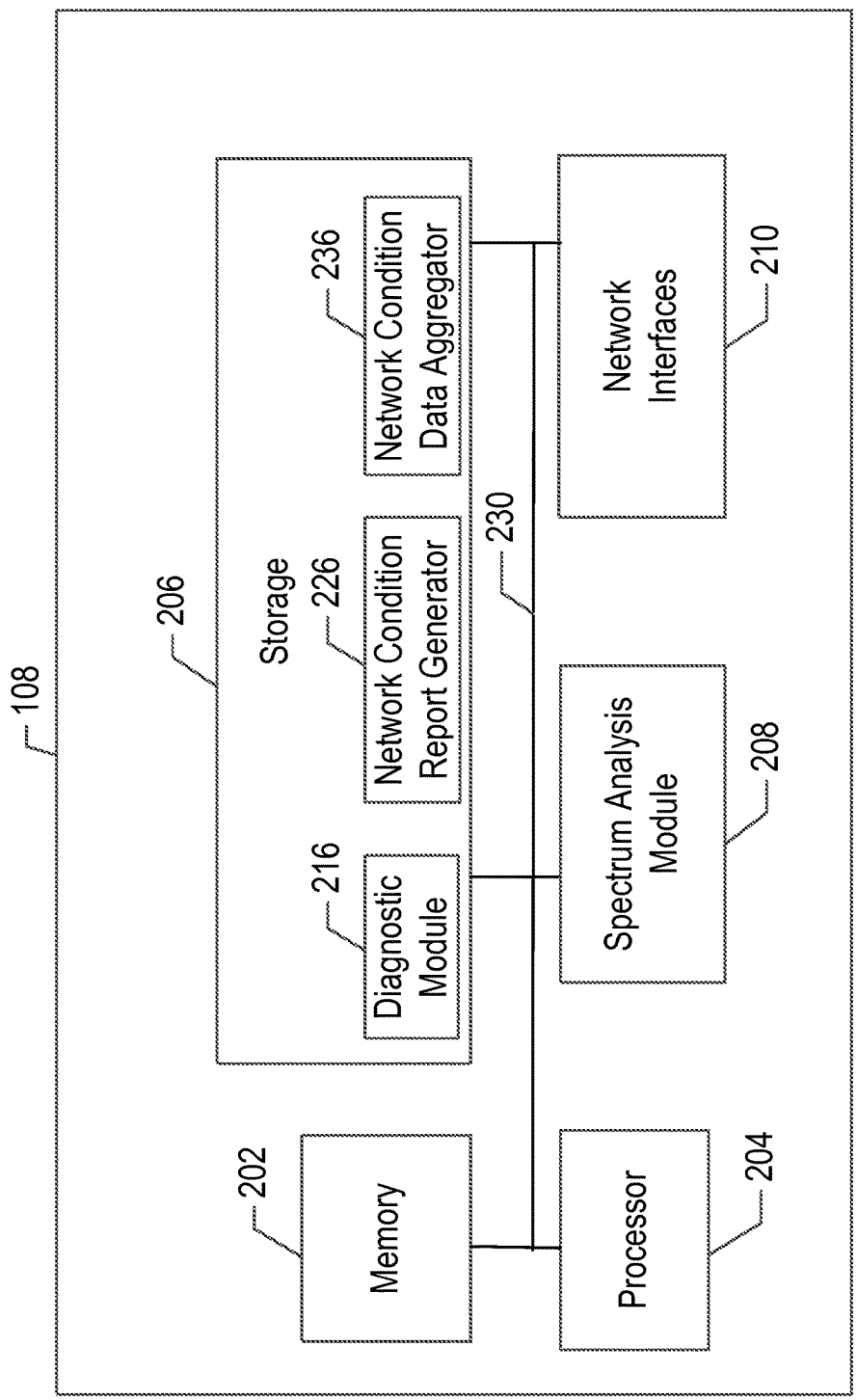
FIG. 2 illustrates an example electronic device that may perform end-to-end network diagnostics.

FIG. 2 illustrates an example wireless access point 108 that may perform end-to-end network diagnostics in accordance with one or more implementations. Not all of the depicted components may be used, however, and one or more implementations may include additional components not shown in the figure. Variations in the arrangement and type of the components may be made without departing from the scope of the subject technology. Additional components, different components, or fewer components may be provided.

The example wireless access point 108 may include memory 202, processor 204, storage 206, spectrum analysis module 208, bus 230, and network interfaces 210. Network interfaces 210 may include a wireless network interface and a network interface. Wireless access point 108 may establish wireless links with computing devices 102-106 via the wireless network interface. Wireless access point 108 may be connected with the access network via the network interface, for example by connecting to the broadband modem 110.

Memory 206 may include a dynamic random-access memory (DRAM) and/or a read-only memory (ROM). Memory 206 may store data and instructions that may be retrieved by processor 204. Storage 206 may include a non-volatile read-and-write memory that stores data and instructions, even when wireless access point 108 is off, that may be retrieved by the processor 204. Storage 206 may include diagnostic module 216, network condition report generator 226, and network data aggregator 236. For example, storage 206 may include a magnetic, solid state or optical media.

From memory 202 and storage 206, processor 204 may retrieve instructions to execute and data to process in order to perform the processes of the subject disclosure. The processor 204 can be a single processor or a multi-core processor in different implementations. Each of diagnostic module 216, network condition report generator 226, and network data aggregator 236 may include instructions that, when executed by the processor 204, cause the processor 204 to perform one or more operations, including, for example, to collect, process network data about wireless local area network 116, access network 112 and wide area network 114 and/or diagnose the source of network issues based on the processed network data.

Network condition data aggregator 236 may include instructions to receive and/or aggregate network data collected by wireless access point 108, and/or the broadband modem 110. Network data may be raw data about wireless local area network 116, access network 112 and wide area network 114, such as a captured packet or a network ping.

The network data may be actively or passively obtainable time-varying or time-constant network data associated with wireless local area network 116, access network 112 or wide area network 114. Passively obtainable network data may refer to network data that may be obtained without user request and/or feedback, such as at a predetermined time interval. Actively obtainable network data may refer to network data that may be obtained upon a user request and/or feedback. Some network data may be both actively and passively obtainable. For example, the network data may be passively obtainable at a predetermined time interval, such as network data obtained on a yearly basis, a monthly basis, a daily basis, an hourly basis, a minute basis, etc. Alternatively or in addition, the network data may be passively obtainable at a predetermined duration, such as collecting network data every 5 minutes on average for 15 seconds per iteration. In some implementations, the network data may be actively obtainable upon a request received from a wireless client device (e.g., computing devices 102-106).

Network condition data aggregator 236 may include instructions to perform operations to analyze the collected network data and obtain condition information about wireless local area network 116, access network 112 and/or wide area network 114 based on the analysis. The condition information may include network data statistics such as data traffic statistics, and/or timing statistics that are generated from the network data.

Network condition data aggregator 236 may include instructions to obtain current condition information based on the most recently collected network data about wireless local area network 116, access network 112 and/or wide area network 114. Network condition data aggregator 236 may include instructions to obtain historical condition information based on the network data collected in the past, for example, during the past year, month, day, hour, etc., about wireless local area network 116, access network 112 and wide area network 114.

Network condition data aggregator 236 may include instructions to receive and/or aggregate time information and/or network identification information pertaining to the network data. For example, network data statistics may include a time-stamp of the network data and a network identifier of the network associated with the network data.

Spectrum analysis module 208 may include one or more radio-frequency transceivers (e.g., transmitter and/or receiver). The one or more radio-frequency transceivers may receive data signals (e.g., spectral and/or temporal data signals) over WiFi channels in a range of WiFi spectrum. Spectrum analysis module 208 may include instructions to perform spectrum analysis including fast Fourier transforms (FFT) of the data signals received from the one or more radio-frequency transceivers or network interfaces 210.

Spectrum analysis module 208 may include instructions to obtain spectrum and/or temporal data statistics, including for example, spectrogram, spectrum density, interference power, WiFi channel power, WiFi channel duty cycle, WiFi channel duty cycle vs. time trending. Alternatively or in addition, spectrum analysis may include signal-to-noise ratio (SNR) analysis and/or received signal strength indicator (RSSI) analysis over WiFi channels. The results of the spectrum analysis may refer to first condition information about wireless local area network 116.

Network condition report generator 226 may include instructions to maintain the obtained condition information. Network condition report generator 226 may include instructions to generate a network condition report to provide a statistical network condition summary based on the obtained condition information, to at least partially characterize the network performance of wireless local area network 116, access network 112 and wide area network 114.

Diagnostic module 216 may include instructions to identify and/or diagnose the source of network issues across wireless local area network 116, access network 112 and wide area network 114. Diagnostic module 216 may include instructions to maintain and/or generate baseline network statistics for each of wireless local area network 116, access network 112 and wide area network 114 based on the obtained historical condition information. Diagnostic module 216 may include instructions to analyze the condition report including the obtained current condition information and the baseline network statistics to identify wireless local area network 116, access network 112 or wide area network 114 as a source of network issues, as is discussed further below with respect to FIG. 4.

Diagnostic module 216 may include instructions to analyze the results of the spectrum analysis to determine signal interference in wireless local area network 116. Signal interference may include interference between a wireless link in wireless local area network 116 and one or more non-WiFi devices that use the same radio spectrum (e.g., 2.4-2.48 GHz), such as microwave ovens, cordless phones, baby monitors, and Bluetooth devices. Diagnostic module 216 may include instructions to determine the source and/or strength of the signal interference based on spectral and/or temporal data statistics, such as spectrum density and/or interference power in the WiFi spectrum.

In some implementations, one or more the functions performed by one or more of processor circuit 204, diagnostic module 216 and/or spectrum analysis module 208 may be offloaded to one or more of computing devices 102-106, such as to utilize additional processing resources, etc. For example, diagnostic module 216 may be included in one or more of computing devices 102-106.

While the above discussion primarily refers to processor 204 that executes instructions, some implementations are performed by one or more integrated circuits, for example, application specific integrated circuits (ASICs) or field programmable gate arrays (FPGAs). In some implementations, such integrated circuits execute instructions that are stored on the circuit itself.

Figure 3:
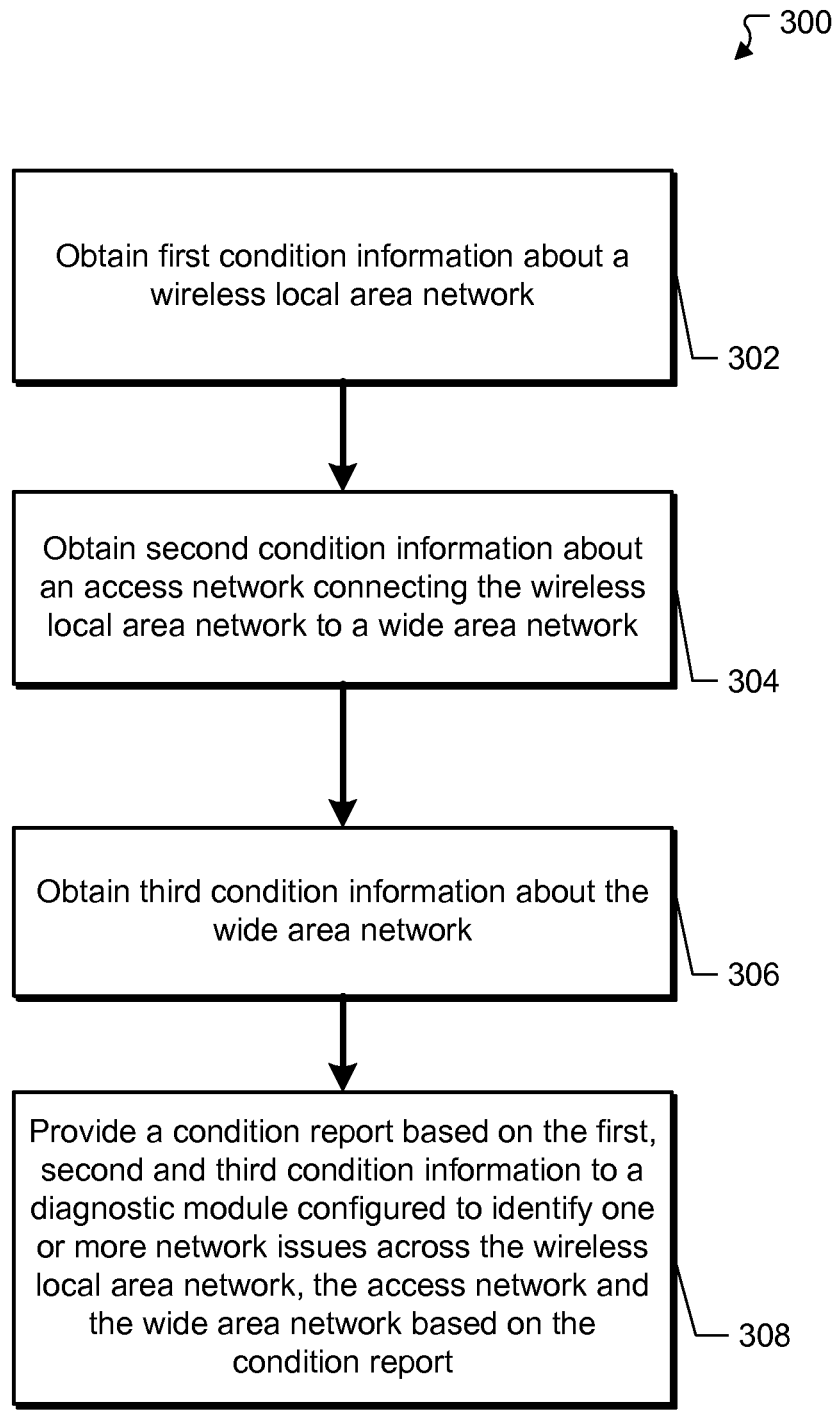
FIG. 3 illustrates a flow diagram of an example process for performing end-to-end network diagnostics.

FIG. 3 illustrates a flow diagram of an example process 300 for performing end-to-end network diagnostics. For explanatory purposes, the example process 300 is primarily described herein with reference to wireless access point 108 of FIGS. 1-2; however, the example process 300 is not limited to wireless access point 108 of FIGS. 1-2, and the example process 300 may be performed by one or more components of wireless access point 108. Further for explanatory purposes, the blocks of the example process 300 are described herein as occurring in serial, or linearly. However, multiple blocks of the example process 300 may occur in parallel. In addition, the blocks of the example process 300 may be performed a different order than the order shown and/or one or more of the blocks of the example process 300 may not be performed.

Wireless access point 108 may perform end-to-end network diagnostics by obtaining condition information about wireless local area network 116 (302), access network 112 (304) and wide area network 114 (306). Based on the obtained condition information, wireless access point 108 may provide a condition report about wireless local area network 116, access network 112 and wide area network 114 to a diagnostic module for end-to-end network diagnostics (308).

At step 302, wireless access point 108 obtains first condition information about a wireless local area network, such as wireless local area network 116. In some implementations, obtaining the first condition information about wireless local area network 116 includes performing a spectrum analysis of a wireless link connecting a client device and wireless access point 108 in wireless local area network 116, such as a wireless link connecting computing device 102 and wireless access point 108, as described above with reference to FIG. 2. The first condition information may include results of the spectrum analysis. Results of the spectrum analysis may include received signal strength, WiFi channel occupancy, and/or signal-to-noise ratio of one or more WiFi channels. Alternatively or in addition, the first condition information may include data traffic statistics for data communicated within the wireless local area network. For example, the data traffic statistics may include wireless bit rate, retransmission rate, and/or throughput of data traffic over one or more WiFi channels.

At step 304, wireless access point 108 obtains second condition information about an access network, such as access network 112, connecting wireless local area network 116 to wide area network 114. Obtaining the second condition information about access network 112 may include requesting diagnostic data from an access network device connecting the wireless local area network to the access network, such as from broadband modem 110. Broadband modem 110 may establish a Transmission Control Protocol (TCP) connection to a network device between wide area network 114 and access network 112, such as a cable modem termination system. In some aspects, broadband modem 110 may send a network ping request to a server connected to wide area network 114. The second condition information may include the diagnostic data received in response to the request. For example, the diagnostic data may include data rate, retransmission rate, and/or round trip time of one or more packets in the diagnostic data.

At step 306, wireless access point 108 obtains third condition information about the wide area network, such as wide area network 114. Obtaining the third condition information about wide area network 114 may include sending a request to a server on wide area network 114 and receiving a response to the request. The request to the server on the wide area network 114 may include a network ping, a domain name system (DNS) lookup request, or a hypertext transfer protocol (HTTP) request.

Wireless access point may send test traffic (e.g., a test transaction or a test packet) to a server connected with wide area network 114 and measure the performance of the test traffic. The performance of the test traffic may include delay measurements, packet loss rates, and/or delay variations.

Wireless access point 108 may send a network Ping command including an IP address of an internet service provider server, such as server 120. Alternatively or in addition, wireless access point 108 may send a network Ping command including an IP address of a third-party content provider server, such as server 130 that provides resources such as HTML files and other content, or performs other functions on behalf of computing devices 120-106. Wireless access point 108 may send a DNS request to a DNS server to determine an IP address associated with the domain name of a server, such as server 120. In some implementations, wireless access point 108 may submit an HTTP request message to a server, such as server 130.

The third condition information may include timing statistics for the request to the server and the response. Wireless access point 108 may receive a response to the network ping, including round trip time including, for example, a maximum and minimum time between the request and the response and/or the amount of packets sent and/or received. The response to the DNS lookup request may include an IP address corresponding to the domain name of server 130. The response to the HTTP request may contain completion status information about the request and may also contain requested content.

At step 308, wireless access point 108 provides a condition report based on the first, second and third condition information to a diagnostic module configured to identify network issues across wireless local area network 116, access network 112 and wide area network 114 based on the condition report, as is discussed further below with respect to FIG. 4. The condition report may include a network performance summary for each of wireless local area network 116, access network 112 and wide area network 114. The network performance summary may include current and/or historical condition information for wireless local area network 116, access network 112 or wide area network 114. The network performance summary may include trending information, such as condition information over a period of time.

Figure 4:
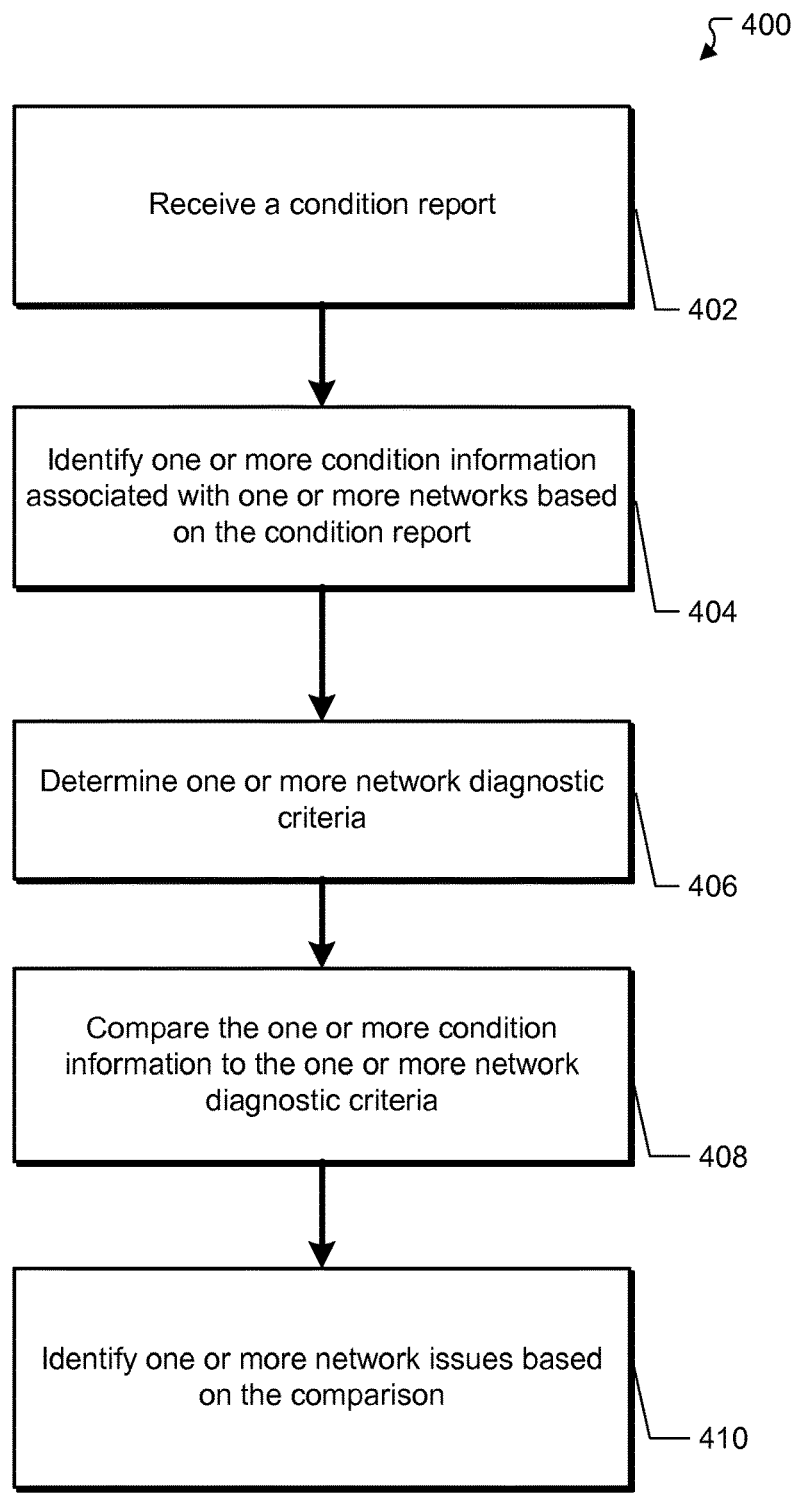
FIG. 4 illustrates a flow diagram of an example process for performing end-to-end network diagnostics.

FIG. 4 illustrates a flow diagram of an example process 400 for performing end-to-end network diagnostics. For explanatory purposes, the example process 400 is primarily described herein with reference to wireless access point 108 of FIGS. 1-2; however, the example process 400 is not limited to wireless access point 108 of FIGS. 1-2, and the example process 400 may be performed by one or more components of wireless access point 108. In one or implementations, all or part of the example process 400 may be performed by computing devices 102-106, rather than, and/or in addition to, wireless access point 108. Further for explanatory purposes, the blocks of the example process 400 are described herein as occurring in serial, or linearly. However, multiple blocks of the example process 400 may occur in parallel. In addition, the blocks of the example process 400 may be performed a different order than the order shown and/or one or more of the blocks of the example process 400 may not be performed.

A diagnostic module may receive a condition report (402). Based on the condition report, the diagnostic module may to identify one or more condition information associated with one or more networks (404). The diagnostic module may determine one or more network diagnostic criteria (406). The diagnostic module may compare the one or more condition information to the one or more network diagnostic criteria (408). The diagnostic module may identify one or more network issues across wireless local area network 116, access network 112 and wide area network 114 (410).

At step 402, the diagnostic module receives a condition report about wireless local area network 116, access network 112 and/or wide area network 114. The condition report may include current condition information that are most recently collected at a predetermined time interval and/or upon a request from one or more of computing devices 102-106, as described above with reference to FIGS. 2-3.

At step 404, the diagnostic module identifies condition information associated with one or more networks based on the condition report, including current first condition information, second condition information and/or the third condition information in the condition report, as described above with reference to FIGS. 2-3.

At step 406, the diagnostic module determines one or more network diagnostic criteria. The diagnostic module may analyze the historical condition information including the historical first condition information, second condition information and/or third condition information (e.g., as described above with reference to FIGS. 2-3) and determine one or more network diagnostic criteria based on the analysis. The one or more network diagnostic criteria may include one or more baseline network statistics for each of wireless local area network 116, access network 112 and/or wide area network 114.

As described above with reference to FIG. 2, wireless access point 108 may collect the historical condition information over a time span, such as a year, a month, an hour, a minute, etc. Time information may be collected in conjunction with the historical condition information pertaining to the time when the historical condition information is being collected, such as time of the day, day of the month. Wireless access point 108 may continuously update and/or adjust the one or more baseline network statistics as additional condition information is received. For example, when a new network device is added, or a new application is implemented, the changes may be updated in the baseline network statistics. The diagnostic module may generate maximum, minimum, and/or average values of the one or more network data statistics in the historical condition information as one or more baseline network statistics of wireless local area network 116, access network 112 and/or wide area network 114.

The diagnostic module may analyze the historical first condition information to generate one or more baseline network statistics of wireless local area network 116. For example, the diagnostic module may analyze the historical data traffic statistics, such as historical wireless bitrate, retransmission rate, and/or throughput of data traffic over one or more WiFi channels, to generate an average value of the wireless bitrate, retransmission rate, and/or throughput of data traffic over one or more WiFi channels and/or fluctuations thereof over a period of time as the baseline data network statistics of wireless local area network 116.

The diagnostic module may analyze the historical second condition information to generate one or more baseline network statistics of access network 112. The diagnostic module may analyze the historical diagnostic data to generate the maximum, minimum, and/or average values of the diagnostic data over a period of time as the baseline data network statistics of access network 112.

The diagnostic module may analyze the historical third condition information to generate one or more baseline network statistics of wide area network 114. The diagnostic module may analyze the historical timing statistics, such as timing statistics in a response to the network ping, to generate an average value of timing statistics and/or fluctuations thereof over a period of time as the baseline data network statistics of wide area network 114.

At step 408, the diagnostic module compares the condition information (e.g., current condition information of step 404, as described above) to the one or more network diagnostic criteria (e.g., one or more network diagnostic criteria of step 406, as described above).

The diagnostic module may compare the current condition information to the range of the one or more baseline network statistics, such as the maximum and minimum value of the one or more baseline network statistics over a period of time. The diagnostic module may compare the current condition information to an average value of the one or more baseline network statistics over a period of time or a distance to the average value thereof, such as a standard deviation. In some implementations, the current condition information of a period of time may be compared against the one or more baseline network statistics over the same period of time, such as to compare the current condition information with the historical condition information collected at the same time period of a day, same day of a month, same month of a year, etc.

At step 410, the diagnostic module identifies network issues based on the comparison. The diagnostic module may identify one or more anomalies in wireless local area network 116, access network 112 and/or wide area network 114 based on the comparison as described above with reference to step 408. The diagnostic module may identify the wireless local area network, the access network or the wide area network as a source of network issues based on the comparison.

Network issues in wireless local area network 116 may include WiFi channel contention (e.g., a WiFi channel crowded by multiple WiFi devices such as nearby access points), Non-WiFi interference (e.g., signal interference due to non-WiFi devices that use the same WiFi spectrum such as Bluetooth devices) and/or weak WiFi signal (e.g., WiFi signal not strong enough due to distance or obstacles).

In some implementations, one or more comparisons may be made for each of the wireless local area network, the access network and the wide area network, as described above with reference to step 408. One or more comparisons for each of the wireless local area network, the access network and the wide area network may be combined, rather than, and/or in addition to, analyzing each comparison individually, to facilitate identifying one or more network issues across wireless local area network 116, access network 112 and wide area network 114.

In some aspects, the diagnostic module may provide a diagnostic report to one or more of computing devices 102-106 after identifying the source of network issues. The diagnostic report may include diagnostic results including, for example, a symptom, diagnostic logs, and/or a source of the network issues. In some aspects, the diagnostic report may include a recommendation regarding how to fix the network issues.

In example aspects, the diagnostic module may provide the diagnostic report in the form of an email or a popup window. The diagnostic module may provide the diagnostic report in the form of a web page, displayed by a browser. Alternatively or in addition, the diagnostic module may provide the diagnostic report using status indicators of the wireless access point 108.

The status indicators of wireless access point 108 may indicate operating states of wireless access point 108, such as power on/off, wireless connection status, wired connection status, and/or internet connection status. The status indicators of wireless access point 108 may include one or more light sources. Each light source may be a light-emitting diode (LED). A light source may include one or more adjustable characteristics, such as off state, on state, color, and blinking rate of the light source. A particular combination of characteristics exhibited by a light source is referred to herein as a "state" of the light source. In example aspects, at a given moment in time, a combination of which light sources of the wireless access point 108 are in an on state, which light sources are in an off state, and/or which light sources are blinking can provide a status indicator of the wireless access point 108 to indicate a source of the network issues, rather than indicating an operating state of wireless access point 108.

Figure 5:
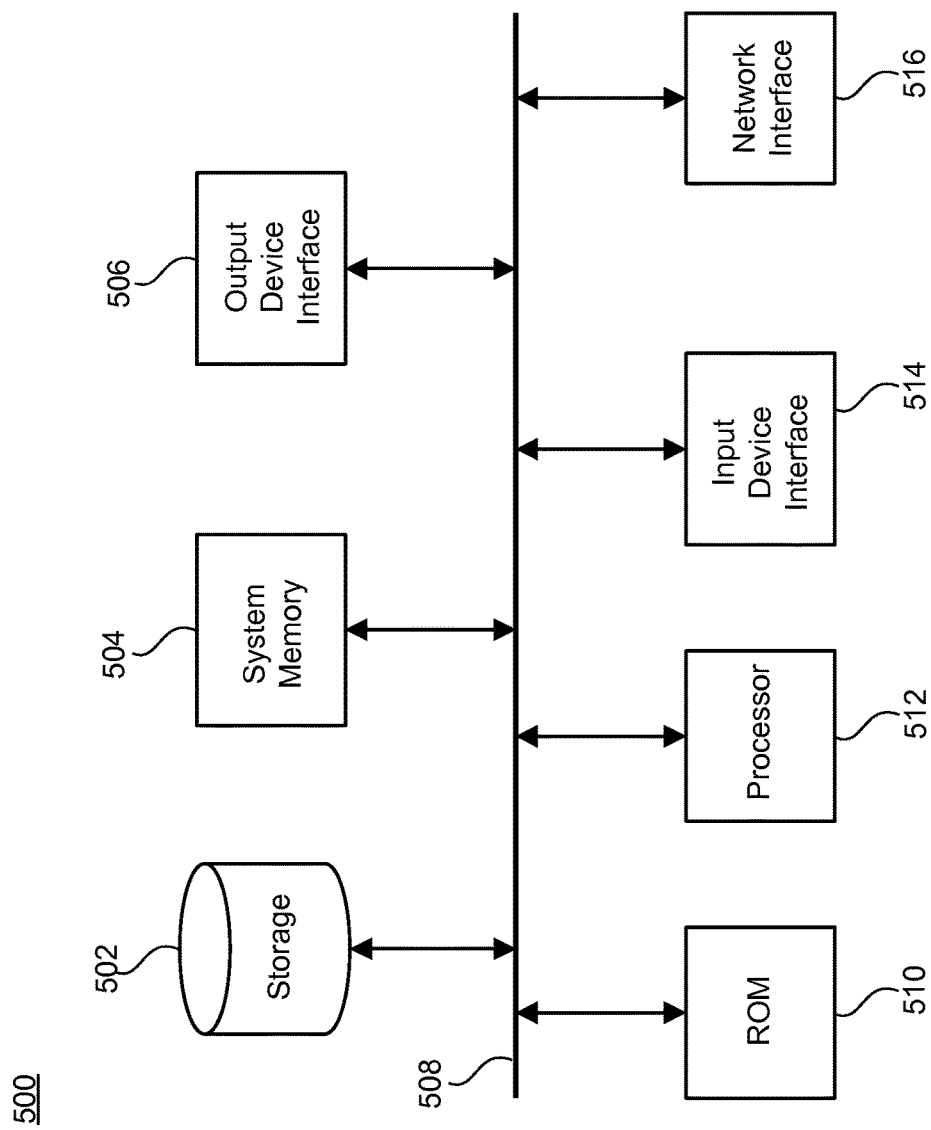
FIG. 5 conceptually illustrates an example electronic system with which some implementations of the subject technology can be implemented.

FIG. 5 conceptually illustrates an example electronic system with which some implementations of the subject technology can be implemented. Electronic system 500 can be a wireless access point, a computer, phone, PDA, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (for example, a magnetic or optical disk and its corresponding disk drive) as permanent storage device 502.

Other implementations use a removable storage device (for example, a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, or ROM 510. For example, the various memory units include instructions for network diagnostics. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, for example, cathode ray tubes (CRT) or liquid crystal displays (LCD). Some implementations include devices, for example, a touchscreen that functions as both input and output devices.

Finally, as shown in FIG. 5, bus 508 also couples electronic system 500 to a network (not shown) through a network interface 516. In this manner, the computer can be a part of a network of computers (for example, a local area network ("LAN"), a wide area network ("WAN"), or an Intranet, or a network of networks, for example, the Internet. Any or all components of electronic system 500 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A network diagnostic system, comprising:
   one or more processors; and
   a machine-readable medium comprising instructions stored therein, which when executed by the one or more processors, cause the one or more processors to perform operations comprising:
   obtaining first condition information about a wireless local area network gathered over a period of time in a day;
   obtaining second condition information about an access network providing a last mile access between the wireless local area network and a wide area network gathered over the period of time in the day, wherein the second condition information comprises at least one of: a retransmission rate and a round trip time of one or more packets;

obtaining third condition information about the wide area network gathered over the period of time in the day;

generating a condition report based on the first, second, and third condition information gathered over the period of time in the day;

identifying one or more baseline network statistics of the wireless local area network, the access network, and the wide area network based on historical condition information of the wireless local area network, the access network, and the wide area network gathered previously over the same period of time in the day;

identifying one or more network issues across the wireless local area network, the access network, and the wide area network based on comparing the condition report and the one or more baseline network statistics; and providing a diagnostic report that includes the one or more network issues to one or more computing devices.

2. The network diagnostic system of claim 1, wherein obtaining the first condition information about the wireless local area network comprises performing a spectrum analysis of a wireless link connecting a client device and a wireless access point in the wireless local area network, and
wherein the first condition information comprises results of the spectrum analysis.

3. The network diagnostic system of claim 1, wherein the first condition information comprises data traffic statistics for data communicated within the wireless local area network.

4. The network diagnostic system of claim 1, wherein obtaining the second condition information about the access network comprises requesting diagnostic data from an access network device connecting the wireless local area network to the access network, the diagnostic data comprising data traffic statistics for data communicated within the access network,
wherein the second condition information comprises the diagnostic data received in response to the request.

5. The network diagnostic system of claim 1, wherein obtaining the third condition information about the wide area network comprises:
sending a request to a server on the wide area network; and
receiving a response to the request,
wherein the third condition information comprises timing statistics for the request to the server and the response.

6. The network diagnostic system of claim 5, wherein the request to the server on the wide area network comprises at least one of a network ping, a domain name system (DNS) lookup request, or a hypertext transfer protocol (HTTP) request.

7. The network diagnostic system of claim 1, wherein obtaining the first, second, and third condition information and providing the condition report is performed at a predetermined time interval.

8. The network diagnostic system of claim 1, wherein obtaining the first, second, and third condition information and providing the condition report is performed in response to a request received from a client device.

9. A computer-implemented method comprising:
obtaining first condition information about a wireless local area network gathered over a period of time in a day;

obtaining second condition information about an access network providing a last mile access between the wireless local area network and a wide area network gathered over the period of time in the day, wherein the second condition information comprises at least one of: a retransmission rate and a round trip time of one or more packets;

obtaining third condition information about the wide area network gathered over the period of time in the day;

identifying one or more baseline network statistics of the wireless local area network, the access network, and the wide area network based on historical condition information of the wireless local area network, the access network, and the wide area network gathered previously over the same period of time in the day;

analyzing the first condition information, the second condition information, the third condition information, and the one or more baseline network statistics;

identifying one or more network issues across the wireless local area network, the access network, and the wide area network based on the analysis; and providing a diagnostic report that includes the one or more network issues to one or more computing devices.

10. The method of claim 9, wherein obtaining the first condition information about the wireless local area network comprises performing a spectrum analysis of a wireless link connecting a client device and a wireless access point in the wireless local area network,
wherein the first condition information comprises results of the spectrum analysis, and
wherein analyzing the first condition information comprises generating one or more spectral or temporal data statistics based on the results, and determining signal interference with the wireless link based on the one or more spectral or temporal data statistics.

11. The method of claim 9, wherein the first condition information comprises data traffic statistics for data communicated within the wireless local area network, and wherein analyzing the first condition information comprises comparing the data traffic statistics to the one or more baseline network statistics of the wireless local area network.

12. The method of claim 9, wherein obtaining the second condition information about the access network comprises requesting diagnostic data from an access network device connecting the wireless local area network to the access network, the diagnostic data comprising data traffic statistics for data communicated within the access network,
wherein the second condition information comprises the diagnostic data received in response to the request, and
wherein analyzing the second condition information comprises comparing the diagnostic data to the one or more baseline network statistics of the access network.

13. The method of claim 9, wherein obtaining the third condition information about the wide area network comprises:
sending a request to a server on the wide area network; and
receiving a response to the request,
wherein the third condition information comprises timing statistics for the request to the server and the response, and wherein analyzing the third condition information comprises comparing the timing statistics to the one or more baseline network statistics of the wide area network.

14. The method of claim 13, wherein the request to the server on the wide area network comprises at least one of a network ping, a domain name system (DNS) lookup request, or a hypertext transfer protocol (HTTP) request.

15. The method of claim 9, wherein obtaining the first, second, and third condition information and providing the condition report is performed at a predetermined time interval.

16. The method of claim 9, wherein obtaining the first, second, and third condition information and providing the condition report is performed in response to a request received from a client device.

17. A non-transitory machine-readable medium comprising instructions stored therein, which when executed by a system, cause the system to perform operations comprising:
  receiving a condition report that includes condition information about a wireless local area network, an access network, and a wide area network gathered over a period of time in a day, wherein the access network provides a last mile access between the wireless local area network and the wide area network, and wherein the condition information corresponding to the access network comprises at least one of: a retransmission rate and a round trip time of one or more packets;
  identifying one or more baseline network statistics of the wireless local area network, the access network, and the wide area network based on historical condition information of the wireless local area network, the access network, and the wide area network gathered previously over the same period of time in the day;
  determining one or more network diagnostic criteria based on the one or more baseline network statistics;
  identifying one or more network issues across the wireless local area network, the access network, and the wide area network based on the condition report and the one or more network diagnostic criteria; and
  providing a diagnostic report that includes the one or more network issues to one or more computing devices.

18. The non-transitory machine-readable medium of claim 17, wherein identifying the one or more network issues comprising:
  comparing the condition report to the one or more baseline network statistics; and
  identifying the wireless local area network, the access network, or the wide area network as a source of the one or more network issues based on the comparison.

19. The non-transitory machine-readable medium of claim 17, further comprising:
  sending a request for the condition report; and
  receiving the condition report, in response to the request or at a predetermined time interval.

* * * * *